Jan. 2, 1940.  H. R. TEAR  2,185,282
LUBRICATING DEVICE
Filed May 24, 1937
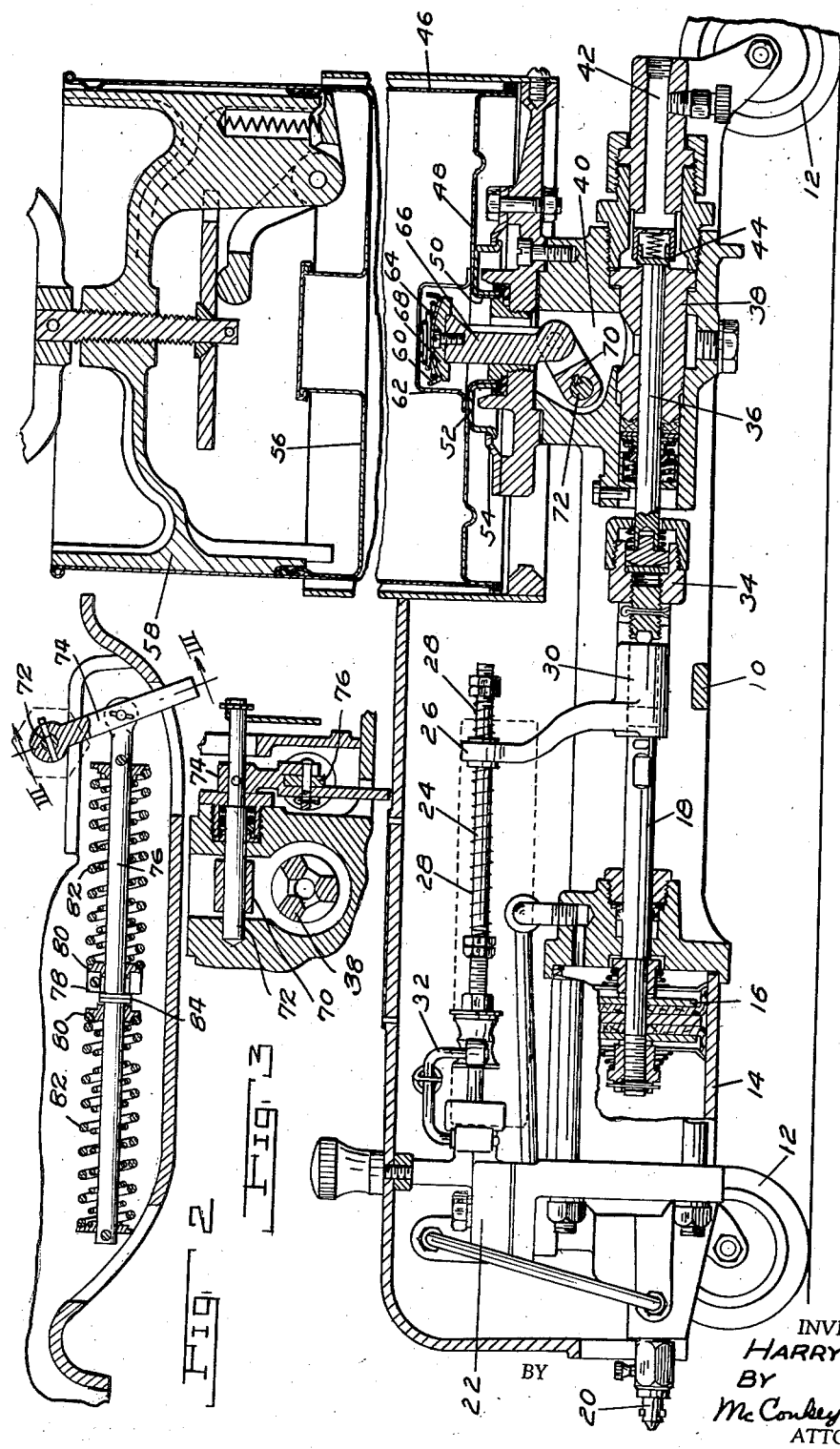
INVENTOR.
HARRY R. TEAR
BY
McConkey & Booth
ATTORNEYS.

Patented Jan. 2, 1940

2,185,282

UNITED STATES PATENT OFFICE 2,185,282

LUBRICATING DEVICE

Harry R. Tear, Evanston, Ill., assignor to The Lubrication Corporation, Chicago, Ill., a corporation of Delaware Application May 24, 1937, Serial No. 144,391

17 Claims. (Cl. 221—47.1)

This invention relates to lubricating devices and more particularly to pumps for dispensing lubricant or the like and to cartridges forming a detachable source of supply for such pumps.

One of the objects of the invention is to provide a pump in which a full charge of lubricant is always supplied.

Another object of the invention is to provide a lubricating device including a pump and a lubricant supply cartridge in which the contents of the cartridge is positively fed into the pump.

Still another object of the invention is to provide a cartridge for use with a lubricant pump in which the cartridge may be attached to the pump quickly and easily and the cartridge contents may easily be forced into the pump.

The above and other objects of the invention may be accomplished by providing a pump having a feed member slidably mounted in its inlet for reciprocation in a cylindrical extension formed on a cartridge around its outlet opening. The cartridge is preferably secured to the pump by a fastener plate which serves also to reinforce the cylindrical extension.

Other objects, advantages and novel features of the invention will be apparent from the following description when read in connection with the accompanying drawing, in which:

Figure 1 is a central section with parts in elevation of a lubricating device embodying the invention;

Figure 2 is a partial section similar to Figure 1 in a different plane; and

Figure 3 is a section on the line III—III of Figure 2.

The illustrated device includes a base 10 mounted on wheels 12 and carrying a motor cylinder 14 in which a piston 16 having a piston rod 18 is slidably mounted. Compressed air or other suitable actuating fluid is admitted to the cylinder 14 through a fitting 20 under the control of a valve indicated generally at 22 and having a control rod 24. A collar 26 surrounds the control rod and is engaged by springs 28 on its opposite sides. The collar 26 is carried by a bracket 30 secured to the piston rod 18 so that the valve will be moved in accordance with piston movement, suitable spring detents 32 being provided yieldingly to hold the valve in either of its end positions.

The piston rod 18 is secured by a resilient coupler 34 to a pump plunger 36 which is slidably mounted in a cylinder 38, which cylinder has a side inlet 40 and an outlet 42 which is controlled by a check valve 44 and which is adapted to supply lubricant through a suitable hose or nozzle to any desired point of use.

Lubricant is supplied to the pump by a cartridge 46 formed with a permanent end closure 48 at one end which has a central outlet opening defined by an outwardly extending cylindrical flange 50. The cartridge is secured to the pump by means of a fastening plate 52 which surrounds and reinforces the flange 50 and which is formed at its edge with a series of notches to provide a bayonet connection with a series of lugs 54 secured to the pump around the inlet opening. The opposite end of the cartridge is closed by a piston or follower 56 slidably fitting in the cartridge body. Preferably a piston guide 58 of the type more fully disclosed and claimed in my Patent No. 2,121,996 is provided to keep the piston in alinement in the cartridge and to urge it downwardly therethrough.

During storage the cartridge outlet opening is closed by means of a valve plate 60 mounted in a suitable cage 62 within the cartridge and urged against the outlet opening by a spring 64. When the cartridge is turned upside down, as shown in Figure 1, to secure it to the pump, the valve 60 prevents leakage of lubricant through the outlet opening until such time as it is unseated, as will be explained hereinafter. If desired, a removable cap may be placed in the outlet opening during storage to prevent entry of dirt into the cartridge and to insure against any leakage of the cartridge contents.

In order to urge lubricant from the cartridge into the pump, there is provided a feed member including a stem 66 slidably mounted in the pump inlet opening and being cut away at one side to permit the flow of lubricant around it. The stem carries at its upper end a circular feed button 68 adapted to fit slidably within the flange 50. The lower end of the stem 66 is connected to a crank arm 70 which is secured to a shaft 72 rotatably mounted in the pump body. A second crank arm 74 is secured to the shaft 72 outside of the pump body and is pivotally connected to a link 76 lying beside the piston rod 18. The link 76 slidably carries a collar 78 which is secured to the bracket 30 and has on each side of the collar 78 a second collar 80 urged toward the center thereof by springs 82. A pin 84 at the center of the link 76 serves as a stop for the collars 80, but the collar 78 is so formed as to slide freely over the pin.

In use a cartridge is secured to the pump by passing the slots in the connector plate 52 over the lugs 54 and turning the cartridge to a position shown in Figure 1. It will be noted that the flange 50 seats around the pump inlet opening with the feed button 68 projecting into the cartridge and raising the valve 60 from its seat. If air is admitted to the motor the piston 16 will be reciprocated, causing the plunger 36 to reciprocate in the cylinder 38 to force lubricant out the outlet opening. On a forward stroke of the plunger the collar 30 will move to the right, as seen in Figure 1, rocking the arm 70 and raising the feed button to the position shown. When the piston 16 reaches the forward end of its stroke, it reverses the valve mechanism and starts on a retractile stroke. This operation simultaneously withdraws the plunger 36 from the cylinder and moves the feed button down to trap lubricant in the cylindrical flange 50 and to force such lubricant into the pump cylinder. Until such time as the plunger 36 passes the inlet port, the feed button cannot move down into the flange 50 and the springs 82 will yield to permit movement of the plunger without moving the feed button. However, as soon as the end of the plunger clears the inlet port, the feed button will be moved down to fill the cylinder.

While one embodiment of the invention has been shown and described in detail, it will be understood that many changes might be made therein, and it is not intended to limit the scope of the invention to the form shown or otherwise than by the terms of the appended claims.

What is claimed is:

1. A pump for lubricant or the like comprising a pump cylinder, a reciprocating plunger in said cylinder, a lubricant supply source communicating with said cylinder, a feed member reciprocable toward and away from the cylinder to urge lubricant from the supply source into the cylinder, and a yielding connection between the plunger and feed member to reciprocate the feed member with the plunger and which will yield to permit movement of the plunger without moving the feed member.

2. A pump for lubricant or the like comprising a pump cylinder, a reciprocating plunger in said cylinder, a lubricant supply source communicating with said cylinder, a feed member movable toward and away from the cylinder to urge lubricant from the supply source into the cylinder, and link and lever means connecting the feed member to the plunger to reciprocate the feed member with the plunger, said link and lever means including a yielding connection which will yield to permit movement of the plunger without moving the feed member.

3. A pump for lubricant or the like comprising a pump cylinder, a reciprocating plunger in said cylinder, a lubricant supply source communicating with said cylinder, a feed member movable toward and away from the cylinder to urge lubricant from the supply source into the cylinder, a crank connected to the feed member to operate it, and yielding means connecting the crank to the plunger to reciprocate the feed member with the plunger and which will yield to permit movement of the plunger without moving the feed member.

4. A pump for lubricant or the like comprising a pump cylinder, a reciprocating plunger in said cylinder, a lubricant supply source communicating with said cylinder, a feed member movable toward and away from the cylinder to urge lubricant from the supply source into the cylinder, a crank connected to said feed member to operate it, a link connected to the crank and lying substantially parallel to the plunger, a collar slidable on the link and connected to the plunger, and springs carried by the link on opposite sides of the collar and forming a yielding connection between the link and the collar.

5. A pump for lubricant or the like comprising a pump cylinder having a side inlet opening, a plunger reciprocably mounted in said cylinder, a lubricant supply source communicating with said side opening, a feed member movable transversely of the cylinder to urge lubricant from said supply source into the cylinder, and means connecting the feed member to the plunger to be reciprocated therewith.

6. A pump for lubricant or the like comprising a pump cylinder having a side inlet opening, a plunger reciprocably mounted in said cylinder, a lubricant supply source communicating with said side opening, a feed member slidably mounted in said inlet opening and adapted to project into said supply source to urge lubricant therefrom into the cylinder, and means connecting the feed member to the plunger to be operated thereby.

7. A pump for lubricant or the like comprising a pump cylinder having a side inlet opening, a plunger reciprocably mounted in said cylinder, a lubricant supply source communicating with said side opening, a feed member slidably mounted in said inlet opening and adapted to project into said supply source to urge lubricant therefrom into the cylinder, a crank connected to the feed member to operate it, and yielding means connecting the crank to the plunger.

8. A lubricating device comprising a pump having an inlet opening, a lubricant supply cartridge having an outlet opening defined by a cylindrical extension and formed for sealing engagement around said inlet opening, and a feed member slidably carried by the pump and reciprocable in said cylindrical extension.

9. A lubricating device comprising a pump having an inlet opening, a lubricant supply cartridge having an outlet opening defined by a cylindrical extension and formed for sealing engagement around said inlet opening, a feed member carried by the pump and slidably fitting in said cylindrical extension, and means operated by the pump for reciprocating the feed member to force lubricant from the cartridge into the pump.

10. A lubricating device comprising a pump having an inlet opening, a lubricant supply cartridge having an outlet opening defined by a cylindrical extension and formed for sealing engagement around said inlet opening, a feed member carried by the pump and slidably fitting in said cylindrical extension, and a yielding connection between the pump and feed member to reciprocate the feed member as the pump is operated, said connection being adapted to yield upon a predetermined resistance to movement of the feed member.

11. A lubricating device comprising a pump having an inlet opening, a lubricant supply cartridge having an outlet opening defined by a cylindrical extension and formed for sealing engagement around said inlet opening, a follower forming a movable closure for the end of the cartridge opposite the outlet opening, a feed member carried by the pump and reciprocable in said cylindrical extension, and a connection between the pump and feed member to reciprocate the feed member as the pump is operated.

12. A lubricating device comprising a pump cylinder having a side inlet opening, a plunger reciprocable in the cylinder, a cartridge having an outlet opening defined by a cylindrical extension and formed for sealing engagement around the inlet opening and a feed member slidable in said cylindrical extension to force lubricant from the cartridge into the pump cylinder.

13. A lubricating device comprising a pump cylinder having a side inlet opening, a plunger reciprocable in the cylinder, a cartridge having an outlet opening defined by a cylindrical extension and formed for sealing engagement around the inlet opening, a feed member slidably mounted in said inlet opening and including a part slidable in said cylindrical extension, and a connection between said feed member and the plunger.

14. A lubricating device comprising a pump cylinder having a side inlet opening, a plunger reciprocable in the cylinder, a cartridge having an outlet opening defined by a cylindrical extension and formed for sealing engagement the inlet opening, a feed member slidably mounted in said inlet opening and including a part slidable in said cylindrical extension, a crank connected to said feed member to operate it, and a connection between the plunger and said crank.

15. A lubricating device comprising a pump cylinder having a side inlet opening, a plunger reciprocable in the cylinder, a cartridge having an outlet opening defined by a cylindrical extension and formed for sealing engagement around the inlet opening, a feed member slidably mounted in said inlet opening and including a part slidable in said cylindrical extension, a crank connected to said feed member to operate it, and a link connected to said crank and lying substantially parallel to the plunger.

16. A lubricating device comprising a pump cylinder having a side inlet opening, a plunger reciprocable in the cylinder, a cartridge having an outlet opening defined by a cylindrical extension and formed for sealing engagement around the inlet opening, a fastening plate secured to the cartridge and formed with a series of notches for bayonet connection with a series of cooperating lugs on the cylinder, said fastening plate reinforcing the cylindrical extension, and a feed member slidable in said extension to force lubricant from the cartridge into the pump cylinder.

17. A cartridge for lubricant or the like comprising a substantially cylindrical body portion, an end closure secured to one end of the body portion formed with an outlet opening, a flange on said end closure forming a cylindrical extension around the outlet opening, and a fastening plate secured to the end closure around said flange to reinforce the flange.

HARRY R. TEAR.